April 21, 1959
H. K. GLEASMAN
2,882,754
TWO-SPEED COASTER HUB BRAKE FOR
VELOCIPEDES AND THE LIKE
Filed Sept. 9, 1957
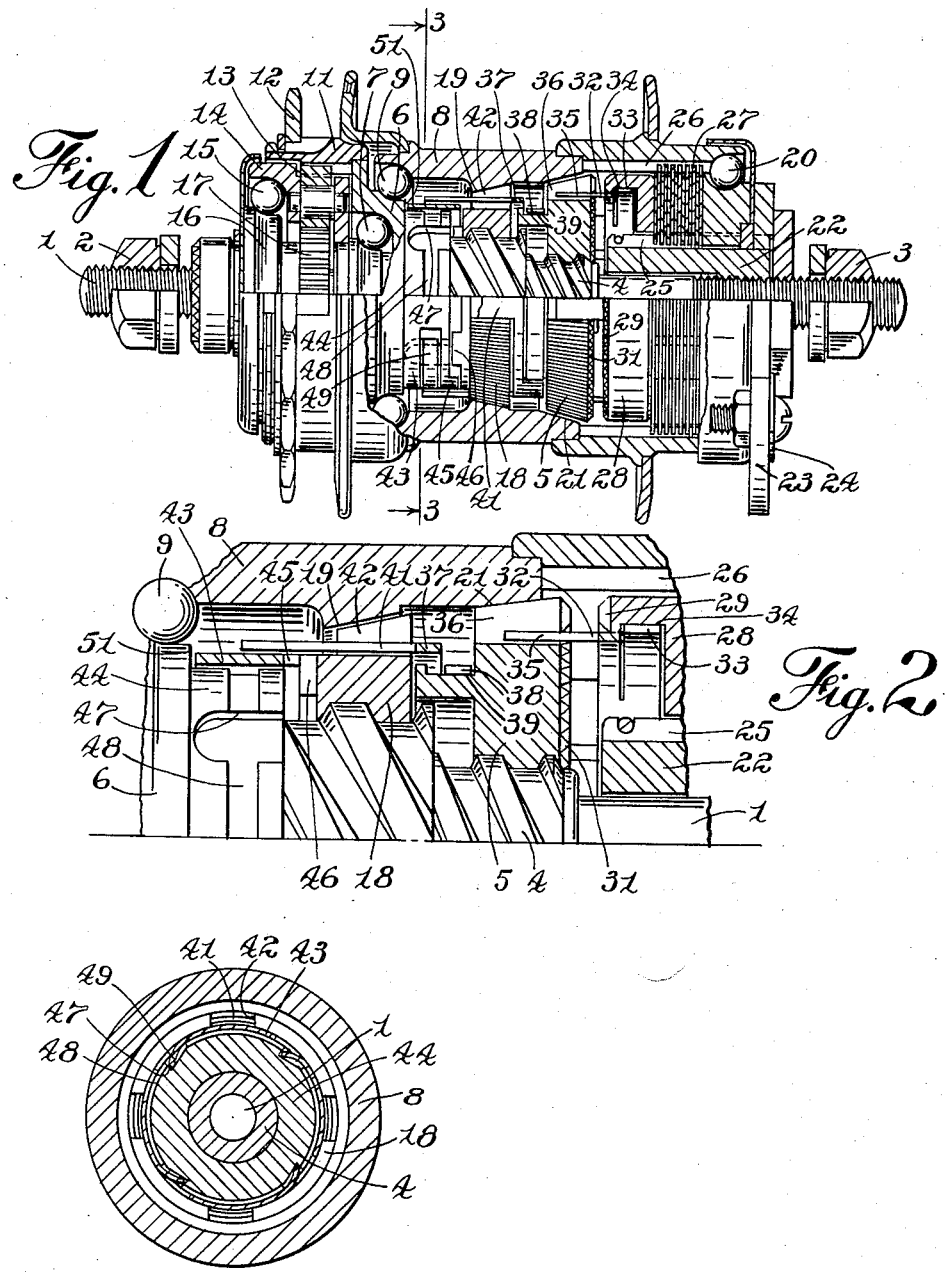
WITNESS:
Esther M. Stockton
INVENTOR.
Hollis K. Gleasman
BY
Clinton S. Janes
ATTORNEY 2,882,754
Patented Apr. 21, 1959

2,882,754
TWO-SPEED COASTER HUB BRAKE FOR VELOCIPEDES AND THE LIKE

Hollis K. Gleasman, Elmira, N.Y., assignor to Bendix Aviation Corporation, Elmira Heights, N.Y., a corporation of Delaware Application September 9, 1957, Serial No. 682,933

4 Claims. (Cl. 74—750)

The present invention relates to a two-speed coaster hub brake for velocipedes and the like, and more particularly to a semi-automatic type in which the selection of the drive ratio is controlled by back pedaling.

The present invention is an improvement of that type of bicycle gearing disclosed in the patents to Svenson 813,464 and 813,465, issued February 27, 1906, and relates particularly to the means for rendering the high speed drive inoperative when it is desired to operate in low gear.

In the Svenson structure, the gear ratio is changed either up or down every time the rider stops pedaling and coasts. This is sometimes undesirable since if the going is easy, permitting occasional coasting, the rider would usually wish to stay in high gear.

It is an object of the present invention to provide a device of this type in which the shift from one ratio to the other is brought abut by back pedaling slightly but does not take place when the operator merely stops pedaling and allows the vehicle to coast forward.

It is another object to provide such a device which is positive and reliable in action and simple and economical in construction.

Further objects and advantages will be apparent from the following description taken in connection with the accompanying drawing in which:

Fig. 1 is a side elevation partly broken away and in section showing a preferred embodiment of this invention;

Fig. 2 is an enlarged sectional detail showing the high speed and low speed clutch mechanisms, and the blocking means for the high speed clutch; and Fig. 3 is a section taken substantially on the line 3—3 of Fig. 1.

In Fig. 1 of the drawing there is illustrated an axle 1 which is arranged to be clamped in the rear fork of a bicycle or the like by means of nuts 2 and 3. A low speed screw shaft member 4 is rotatably mounted on the axle 1 and has a low speed clutch nut member 5 threaded thereon. A high speed screw shaft member 6 is rotatably mounted on the low speed shaft by means of bearings 7 and and rotatably supports a hub 8 by means of bearing 9. Means for rotating the high speed shaft member 6 is provided in the form of an orbit gear member 11 fixedly mounted thereon and having a driving sprocket 12 rigid therewith and adapted to be rotated by the rider of the vehicle in the usual manner.

Reduction gearing for rotating the low speed shaft member from the orbit gear 11 is provided comprising a plurality of planet pinions 13 mounted in a planet carrier 14 forming part of the driven shaft member and rotatably mounted on the axle 1 by means of bearings 15 cooperating with a cone member 16 which is clamped to the frame of the vehicle by means of the clamp nut 2. The planet pinions 13 mesh with a sun gear 17 which is rigid with the cone member 16 whereby rotation of the orbit gear 11 is transmitted to the low speed shaft member at a reduced speed.

A high speed clutch nut 18 is threaded on the high speed screw shaft 6, and the hub 8 is formed with clutch surfaces 19 and 21 which are engageable by the high speed and low speed clutch nuts respectively upon forward rotation of the screw shafts on which they are mounted.

A brake anchor member 22 is mounted on the axle 1 and prevented from rotation by means of a torque arm 23 connected by a clip 24 to the frame of the vehicle. A second bearing 20 for the hub 8 is mounted on said anchor member. The anchor member 22 is formed with axially extending slots 25, and the interior surface of the hub 8 is formed with similar slots 26. A plurality of brake discs 27 are alternately splined to the brake anchor member and the hub by means of lugs formed on said discs engaging in the slots 25 or 26 of said members. Means for compressing the discs 27 to resist rotation of the hub is provided comprising pressure ring 28 splined on the anchor member 22 and having teeth 29 adapted to be engaged by similar teeth 31 on the low speed clutch nut 5 when the latter is traversed into engagement therewith by backward rotation of the low speed screw shaft 4.

Means for retarding rotation of the low speed clutch nut 5 in order to insure its traversal in either direction by appropriate rotation of the low speed screw shaft is provided in the form of a drag member 32 having a plurality of fingers 33 bearing frictionally in an interior groove 34 in the brake anchor member and having arms 35 slidably engaging in slots 36 in the periphery in the low speed clutch nut. Similarly, retarding means for the high speed clutch nut 18 is provided comprising a drag member 37 having arms 38 bearing frictionally in a peripheral channel 39 of the low speed clutch nut, and having arms 41 slidably engaging in peripheral slots 42 of the high speed clutch nut.

According to the present invention means are provided for optionally preventing engagement of the high speed clutch in order to permit engagement of the low speed clutch. For this purpose a blocking annulus 43 is rotatably mounted on an enlarged portion 44 of the high speed clutch member 18, and these members are provided with arcute projections 45 and 46 which extend toward each other and are equally spaced about their peripheries, the spaces between said projections being sufficiently large to receive the projections of the adjacent member when the projections of one member register with the spaces of the other member.

A step by step pawl and ratchet connection is provided between the high speed shaft member 6 and the annulus 43 comprising a plurality of equally spaced abutments 47 formed in the bottom of a circumferential channel 48 in the portion 44 of the high speed shaft member, and spring pawl arms 49 extending inwardly from the body of the annulus 43 and bearing on the bottom of the channel 48. The abutments 47 are spaced correspondingly to the projections and to the spaces between the projections of the annulus 43, and are so positioned that when the pawls 49 engage the abutments, in one position of the annulus the projections 45 of the annulus are in alignment with the spaces between the projections 46 on the high speed clutch nut so that the latter is permitted to move into clutching engagement with the surface 19 of the hub. When the annulus has been stepped forward on the high speed shaft member so that the pawls 49 thereof engage the next consecutive abutment 47, the projections 45, 46 of the annulus and high speed clutch nut will be brought into alignment, whereby the engagement of the high speed clutch is prevented.

In order to bring about this step by step advancement of the annulus 43 on the high speed shaft member 6, the arms 41 of the drag member 37 are arranged to bear frictionally on the periphery of said annulus and resist its rotation when the high speed clutch nut is stationary. Backward rotation of the high speed shaft member will then cause the annulus to be indexed forwardly with respect to said shaft member.

The engagement of the spring pawls 49 in the channel 48 prevents axial movement of the annulus on the section 44 of the high speed shaft. The axial thrusts of the high speed clutch nut 18 on the annulus when it is performing its blocking function are preferably taken by a shoulder 51 on the high speed shaft member adjacent said annulus.

In operation, forward rotation of the sprocket 12 is transmitted through the orbit gear 11 to the high speed shaft member 6, and through the planet pinions 13 to the low speed shaft member 4. If, at the time, the projections 45 of the blocking annulus 43 are in alignment with the spaces between the projections 46 of the high speed clutch nut, the latter is traversed into engagement with the hub by reason of its drag connection through the retarders 37 and 32 to the axle 1, and the hub 8 is consequently rotated at the same speed as the sprocket 12. If the operator stops pedaling and allows the vehicle to coast forward, the relationship of the parts is not disturbed, and when he resumes pedaling, the drive will still be in high gear.

If he desires to shift into low gear, he back-pedals slightly, and since at this time the blocking annulus 43 is prevented from rotation by its frictional connection through the arms 41 to the drag member 37, the high speed shaft member rotates backward within said annulus one step, to bring the pawls 49 into position to engage the next abutment 47 in the forward direction. This brings the projections 45 of the annulus 43 into alignment with the projections of the high speed clutch nut 18 whereby, when the operator resumes forward propulsion, the high speed clutch nut is prevented from engaging the hub and the low speed clutch nut 5 is then permitted to engage the hub and drive it at reduced speed. When desired, the shift back from low speed to high speed is accomplished similarly by the same maneuver.

The spacing of the low speed clutch nut 5 from the brake compressing member 28 during forward propulsion of the vehicle is made sufficient to permit backward rotation of the low speed screw shaft 4 to the extent necessary to accomplish the gear shifting function without applying the brake. If so desired, this space between the low speed clutch nut 5 and the brake applying member 28 may be made sufficient to enable the high speed shaft member 6 to rotate backwardly two steps with respect to the blocking annulus 43 before the brake is applied. This enables the operator to actuate the brake without effecting the change in gear ratio. In such case the change in gear ratio is brought about by a distinctly smaller amount of backward rotation by the sprocket 12 so as to index the blocking annulus 43 only one step with respect to the high speed shaft member.

Although but one form of the invention has been shown and described in detail it will be understood that changes may be made in the design and arrangement of the parts without departing from the spirit of the invention.

I claim:

1. In a two-speed coaster brake for velocipedes and the like, a fixed axle, a low-speed screw shaft member rotatably mounted on the axle, a low-speed clutch nut threaded on said screw shaft, a high-speed screw shaft member rotatably mounted on the low-speed shaft, a high-speed clutch nut threaded on the high speed shaft, a wheel hub rotatably mounted on the high-speed shaft member having clutch surfaces engageable by said clutch nuts on forward rotation of their respective screw shafts relative thereto, means for rotating the high-speed shaft member, reduction gearing connecting the high-speed shaft member to the low speed shaft member, a blocking annulus rotatably mounted on the high-speed shaft member in the path of engaging movement of the high-speed clutch nut, said annulus and high-speed clutch nut having a plurality of equally spaced arcuate lateral projections extending toward each other, drag means for frictionally opposing rotation of said clutch nuts and annulus, and a ratchet stepping connection between the high-speed shaft member and the annulus.

2. A two-speed coaster brake as set forth in claim 1 in which said ratchet connection between the high-speed shaft member and annulus comprises a plurality of abutments on the periphery of the high speed shaft member spaced similarly and corresponding to the lateral projections of the annulus and to the spaces between said projections, and a pawl on the annulus engageable with said abutments to transmit forward rotation of the high speed shaft member to the annulus.

3. A two-speed coaster brake as set forth in claim 2 including further brake means for the hub actuated by the low-speed clutch nut responsive to backward rotation of the low-speed screw shaft, the spacing of the brake-actuating parts during forward propulsion being so arranged that backward rotation of the high-speed shaft member with respect to the blocking annulus to the extent of at least one step of the pawl and ratchet connection therebetween is permitted prior to the actuation of the brake.

4. A two-speed coaster brake as set forth in claim 2 in which the periphery of the high-speed shaft member on which the blocking annulus is mounted is provided with a circumferential groove slidably receiving the pawl of said annulus to thereby prevent axial movement of the annulus on said high-speed shaft member.

References Cited in the file of this patent

UNITED STATES PATENTS

| | | |
|---|---|---|
| 942,520 | Rockwell | Dec. 7, 1909 |
| 2,741,934 | Douglas | Apr. 17, 1956 |
| 2,747,708 | Peterson | May 29, 1956 |
| 2,803,976 | Hood | Aug. 27, 1957 |